Dec. 6, 1966     J. A. NICOSIA     3,289,704
SECTIONALIZED PIPE
Filed Jan. 22, 1965
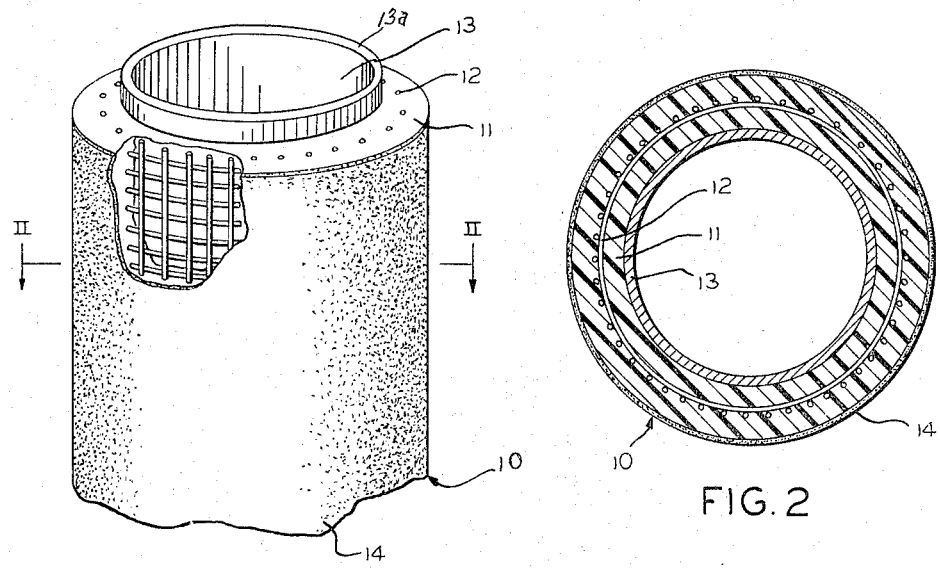
FIG.1
FIG.2
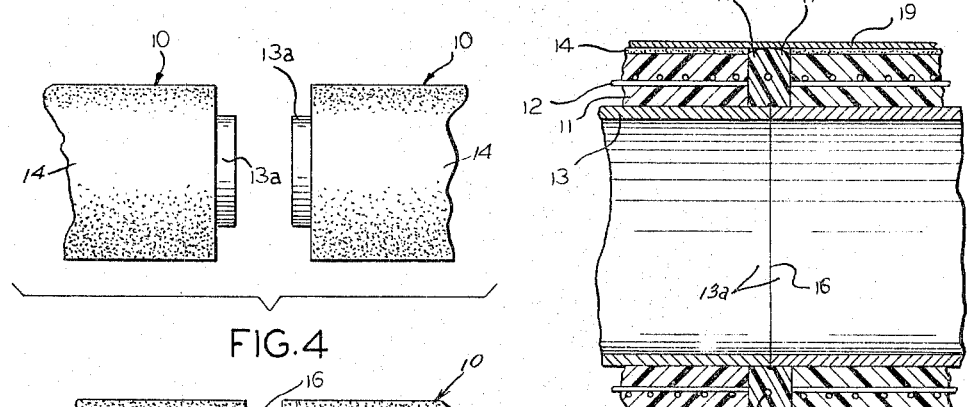
FIG.4
FIG.3
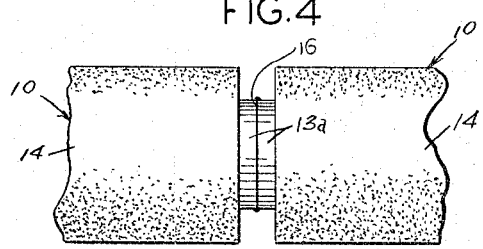
FIG.5
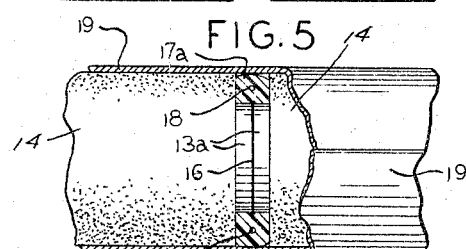
FIG.6
FIG.7
INVENTOR.
JOSEPH A. NICOSIA
BY Hill, Sherman, Meroni, Gross & Simpson
ATTORNEYS

United States Patent Office 3,289,704
Patented Dec. 6, 1966

3,289,704
SECTIONALIZED PIPE
Joseph A. Nicosia, 819 N. Thatcher Ave.,
River Forest, Ill.
Filed Jan. 22, 1965, Ser. No. 432,047
7 Claims. (Cl. 138—155)

This invention generally relates to a fluid pipe and a pipe joint and the method of making the pipe and the joint and more particularly to the method of making a sectionalized pipe of foamed synthetic resin.

The present application is a continuation-in-part of my copending application entitled "Sectionalized Pipe," Serial No. 198,363, filed May 28, 1962 now abandoned.

In the past, foamed synthetic resins, such as polyurethane, have been known to have excellent insulating properties as well as excellent abrasion and wear resistance. While polyurethane has excellent insulating properties, its use has been limited in the building field since it does not possess the necessary load bearing properties required in pipe structures.

The present invention preferably utilizes a reinforced rigid type foam polyurethane sectionalized pipe which has the beneficial abrasion resistance properties, wear resistance properties, insulating properties of foamed synthetic resins and also has the necessary strength rigidity to withstand the stresses encountered by load bearing underground pipes such as water and sewage pipe lines.

It is therefore an object of the present invention to provide a reinforced rigid foam synthetic resin sectionalized pipe with the resin preferably comprising a rigid closed cell foam polyurethane. Non-rigid open cell type resins would be unsuitable as being incapable of sustaining substantial loads and as having undesired moisture or water absorption characteristics where a reinforced closed cell rigid type polyurethane is used a pipe can be formed having the desired moisture resistant and load sustaining characteristics.

Still another object of the present invention is to provide a reinforced rigid type foam polyurethane sectionalized pipe comprised of a series of pipe sections which may be secured together for underground load bearing installation.

It is still another object of the present invention to provide a method of forming a foam polyurethane sectionalized pipe section.

It is still another object of the present invention to provide a polyurethane foam reinforced pipe section.

A still further object of this invention is to provide a method of forming a pipe joint for foam polyurethane pipe sections.

Yet another object of this invention is to provide a reinforced polyurethane foam pipe joint.

Other objects, features and advantages of the present invention will be apparent from the following detailed description taken in conjunction with the accompanying figures of the drawings.

On the drawings:

FIGURE 1 is a perspective view of a pipe section constructed in accordance with the present invention;

FIGURE 2 is a cross sectional view taken substantially on the line II—II looking in the direction indicated by the arrows, as seen in FIGURE 1;

FIGURE 3 is a fragmentary longitudinal section of a pipe joint joining a pair of pipe sections in assembly;

FIGURE 4 is a fragmentary side elevation of a pair of pipe sections showing the manner in which they are positioned prior to assembly together;

FIGURE 5 is a fragmentary side elevation of the pipe sections shown in FIGURE 4 only with the sections secured in welded assembly;

FIGURE 6 is a fragmentary side elevation of the pipe sections provided with a polyurethane reinforced joint; and FIGURE 7 is a perspective view of ring segments used in the formation of the joint shown in FIGURE 6.

As shown on the drawing:

The structural pipe sections and pipes of the present invention are made from any suitable foamed synthetic resin, i.e., foamed polystyrene beads such as Pelaspan 8 and Pelaspan 18, polystyrene flakes, epoxy resin, polyurethane of the polyester and polyurethane of the polyether type. The load bearing pipe sections of the present invention are formed by conventional methods of forming and molding synthetic resins. The pipe sections will be constructed either by batch hand pour, mechanically mixed or froth foam and will be cured by the room temperature or elevated temperature methods. The elevated temperature methods will use internal heating elements such as steam, hot oil or electrical means within the mold or the external methods with a box or batch type oven. The density of the molded foam synthetic resin pipe section with the reinforcement embedded therein is between 1.7 to 15 pounds per cubic foot.

A preferred synthetic resin for the structural pipe section of the present invention is polyurethane. The pipe section is formed by preparing an essentially homogeneous foamable mixture of polyisocyanate, an active hydrogen containing organic substance capable of forming polyurethane structure with said polyisocyanate, and a foam blowing agent. The mixture, which contains a sufficient blend for generating a resultant body of foam that will exert positive pressure on the mold surface is poured into the mold. The mixture is then cured in the mold whereby the resultant positive pressure forms a smooth-skinned article whereupon the article is removed from the mold.

For foaming and curing of the product it has been preferred to use an enclosing mold having the reinforcing means and the metal liner attached in place in the mold and overcharging the mold with reactant mix, i.e., there is more mix poured into the mold than would be necessary to just fill the total mold cavity with foam. The excess charge of mix results in a foam that exerts a positive pressure, that is, about 2 to 20 p.s.i., on all mold surfaces which produces a skin on the molded article and enhances its final appearance as discussed above. If desired, a bleeder should be used to control mold pressure.

A pipe section of the present invention is provided by taking a foamable mixture of 100 parts by weight resin and 87 parts by weight of prepolymer, and vigorously agitating at 78° F. (5.4# free foam density). The mixture is then poured into a mold. The mold is capped and locked. After the foaming action has stopped and subsequently cured, the mold is dismantled, the plugs removed, and the finished pipe section is ready for installation.

Either the semi-prepolymer or the one-shot formulation technique is acceptable for preparing the polyurethane (polyester or polyether) foamable mixture for use in this invention. In the semi-prepolymer process the total polyisocyanate called for in the formulation is premixed with less than all of the active hydrogen-containing compound of the final product, the reaction is allowed to take place between these two components. This resulting semi-prepolymer is then vigorously blended with the remaining formulary ingredients plus the rest of the active hydrogen-containing compound to form a foamable mixture.

In the one-shot technique all the ingredients called for in the formula are initially vigorously mixed so that conversion of raw ingredients to a foamable mixture is accomplished in a single stage. With either technique a homogeneous mixture of foamable ingredients is made. With either technique dyes or pigments can be added during the processing of the raw materials. After vigorous mixing the resulting mixture will be colored in a uniform manner in correspondence with these dyes, stains, pigments, or combination thereof. Therefore, the foamable mixtures may be the color of the formulary ingredients or that of a pigment or dye addition.

Any polyurethane foam type is suitable for the making of a pipe section of the present invention, i.e., rigid, semi-rigid, or flexible. In this connection, organic compounds containing active hydrogen include those wherein such hydrogen content is small, resulting in minimal polymer cross-linkage and those of greater active hydrogen content. The former compounds produce flexible foams whereas the latter compounds initiate greater chain cross-linkages and can play a part in forming semi-flexible or rigid foams. Additionally, combinations of urethane group reactive hydrogens with isocyanate can be taken advantage of to give polymer cross-linking and resultant foam rigidity. Small amounts of water may be added to combine with the isocyanate group to form an amine. The amine will react with isocyanate to give a urea, which will then react in a polymer cross-linking manner with additional isocyante to form biuret bridges. The biuret bridges add further strength to the foam structure.

The foam forming reaction can be manipulated by conventional catalysts, and the cell size of the foam may be controlled by the addition of suitable surfactants such as conventional silicone oil or polyglycol-silicone polymer. Examples of reaction catalysts include n-methylmorpholine, tetramethylbutanediamine, tri-ethylenediamine, stannous octoate, and bibutyl tin dilaurate.

Foaming of the reactants is conventionally handled by either dissolving a blowing agent in the foamable mixture or by adding water to such a mixture. In water addition, carbon dioxide for foaming will be produced by either the reaction between an isocyanate and water to form an amine or it will be produced when water reacts with the urethane linkage of a semi-prepolymer mix. If the water addition method is not employed, suitable conventional halogenated propellants such as dichlorodifluoromethane, trichloromonofluoromethane, trifluoromonochloromethane and mixtures of same may be added to the mixture for foaming.

The present invention provides the building industry with a light weight pipe section that is used to construct a pipe line for use in building motels and similar structures either in load bearing or non-load bearing capacities. The pipe sections of the instant invention may be conveniently handled and rapidly installed by relatively few workers. As a result the overall cost of laying a pipe is drastically reduced. Reduction in cost, of course, is a major consideration in the highly competitive pipe line industry.

The pipe sections of the present invention are made from reinforced moisture resistant rigid foamed synthetic resin preferably comprising polyurethane and not only reduce the cost of comparative size pipe line but also provide a pipe line of longer endurance. The reinforced foamed synthetic resin pipe section such as where formed from polyurethane has excellent strength for resisting any structural stresses which may be encountered; has excellent insulating properties to reduce the cost of heating or cooling the building; has excellent wear, abrasion, moisture and weather resistance; and may easily be provided with additional materials to give it any desired beneficial properties.

The pipe sections of the present invention are advantageously used also as in gas lines, sewage lines, hot fluid lines, air cooling lines and in any manner that pipe sections and pipes are generally used. The pipe sections may be of any suitable shape such as round or circular, multi-sided and the like.

Referring to FIGURE 1, there is shown a tubular section 10. The tubular pipe section 10 includes a foam synthetic resin tubular body 11 that is provided with reinforcing means here illustrated as an annular screen 12 which extends the entire length of the tubular body 11 and is substantially centered in the cross-sectional thickness thereof. A typical reinforcing screen is quarter inch wire welded steel rods having a No. 3 to a No. 7 type mesh. It is, of course, understood that wire screens are not the only type of reinforcing means that may be used. Embedded rods, expanded metal laths and similar means are applicable for reinforcing the pipe section 10 of the present invention.

Disposed interiorly of the body 11 is a tubular liner 13. The tubular line may be comprised of any suitable material such as steel, asphalt impregnated paper and other suitable materials which are load bearing and water resistant and is possessed of ends 13a, 13a which extend beyond opposite ends of the tubular body 11 These ends on the pipe sections 11 are adapted to be secured together as will hereafter be described in connection with the formation of a pipe.

The pipe section 11 has a thin asbestos covering 14 on its exterior face. The asbestos covering aids in supplying fireproofing and heat resistance to the pipe section 11. It is fastened to the pipe section in any suitable manner, i.e., bonded thereto with an adhesive, molded thereto during the molding of the tubular body 11, and by any suitable mechanical fastening means.

It is, of course, understood that the asbestos cover is not necessary. The outer surface of the tubular body 11 may form the exterior pipe surface.

Secured over a weld or cemented joint 16 is a reinforced polyurethane ring 17. The ring 17 is comprised of a pair of reinforced polyurethane ring segments 17a, 17a. The segments 17a, 17a may be secured together in any suitable manner such as by an epoxy resin cement adhesive molded thereto during the molding of the ring sections or segments, and by any suitable mechanical fastening means such as indicated at 17b. By using an epoxy resin cement with the ring segments, a continuous water proof cemented joint can be formed at the juncture of the molded reinforced rigid type foam urethane sections to further seal the weld or cemented joint 16. The segments 17a are reinforced by means of reinforcing means comprising wires 18, or mesh, or rods, of the same type as previously described. In this connection it will be appreciated that the ring segments 17a may be formed and reinforced in the same way as the pipe sections 11 except that a differently configurated mold would be employed. As will be observed in FIGURES 2 and 5, the ring 17 in each instance not only encases the joint 16 in sealing relation but also engages the contiguous or confronting ends of the bodies 11 whereby to afford continuity of mutual support of the bodies to relieve the joint of strain.

After the pipe sections 11 have been secured together by the weld 16 and by means of the rings 17, a waterproof material such as tar paper 19 is wrapped about the pipe sections 11 and about the joint to prevent moisture seepage into the interior of the liner 13. As shown in FIGURE 3, the joint-encasing rings 17 have an exterior diameter slightly larger than the outside diameters of the bodies 11 so that even with the asbestos coverings 14, the water proof covering 19 which encases the joined pipe sections will engage the perimeters of the rings.

By forming a joint in the manner set forth above, it will be appreciated that the sections may better resist coming apart and that seepage between the sections at the area of the liner may be absolutely prevented. Thus, not only can a fluid pipe be provided but in addition, the pipe may be made from a very light weight reinforced material, of the type herein described, to reduce installation cost as well as manufacturing costs.

As a further embodiment of the invention, the polyester-urethane foam component was produced according to the following procedure:

An alkyd resin was prepared comprising:

| | |
|---|---|
| Adipic acid | 16 moles. |
| Diethylene glycol | 18 moles. |
| Glycerine | 1 mole. |
| Catalyst (toluenesulfonic acid) | 0.1 percent based upon the mixture. |

This mixture was reacted in accordance with the conventional procedures to form a resin having a hydroxyl value in range of 60 to 80 and an acid number of 2 or less.

The foregoing polyester in liquid form and in an amount of 11.15 parts by weight was incorporated with 6 parts by weight of sodium acetate trihydrate (a water supplying agent).

This composition in an amount of 12.6 parts by weight was mixed with 62.5 parts by weight of the polyester as first described, .035 part by weight of N-methylmorpholine as a catalyst of reaction, and 21.3 parts by weight of a commercial mixture of tolylene diisocyanates such, for example, as sold by the Du Pont Company.

The several ingredients were thoroughly mixed and were then cured in a container but with a free surface, at a temperature of about 220° F. to provide a flexible, highly porous, sponge structure of large bubbles well distributed in a foam of small bubbles. The container is tubular in shape and was mounted to contain No. 3 wire mesh closely spaced from a pipe liner, thereby providing the tubular container into which the composition was poured for curing.

It will be understood that modifications and variations may be effected without departing from the scope of the novel concepts of the present invention.

I claim as my invention:

1. A load bearing pipe section capable of being used in a fluid pipe line comprising
   a tubular moisture absorption resistant rigid type foamed polyurethane body,
   said tubular polyurethane body having a load bearing liner extending interiorly the length of the tubular polyurethane body and beyond its opposite ends for bonded attachment with other pipe sections,
   a tubular wire screen reinforcing means extending substantially the entire length of said pipe section and embedded in said body, and
   said wire screen being substantially centered in the cross-sectional thickness of said body.

2. A fluid pipe line comprising
   a plurality of tubular pipe sections each having a rigid type foam polyurethane body,
   a wire reinforcing screen embedded in said polyurethane body,
   said reinforcing wire screen extending the entire length of the body,
   a metal liner disposed interiorly of each one of said tubular pipe sections and extending beyond its opposite ends,
   said sections having joints at opposite ends with said metal liners and being welded together at said joints providing a load bearing pipe line having sufficient strength to act as an underground fluid conduit,
   a plurality of polyurethane ring segments overlying said welded line at each of said joints and bonded in assembly together and with said liners,
   a wire reinforcing means embedded in said polyurethane ring segments,
   said polyurethane ring segments providing respective joint-encasing rings each having an exterior diameter slightly larger than an outside diameter of said bodies,
   and a waterproof covering encasing said bodies of the sections and engaging the perimeters of said rings.

3. A fluid pipe line comprising
   a plurality of moisture absorption resistant tubular pipe sections each having a rigid type foam polyurethane body,
   reinforcing means embedded in and extending the entire length of and intermediate the cross-sectional thickness of each of the bodies,
   a load bearing liner disposed interiorly of each one of said tubular pipe sections and having end portions extending beyond the respective opposite ends of its body,
   said sections being disposed end-to-end and with the ends of said load bearing liners bonded together to provide joints,
   and a plurality of polyurethane ring segments encircling the extending end portions of said liners and said joints and filling in between the adjacent ends of said bodies and being bonded together to provide respective rings which seal said joints and by engagement with the confronting ends of the bodies afford continuity of mutual support of the bodies to relieve the joints of strain.

4. A pipe line as defined in claim 3 in which said bodies have an asbestos covering bonded thereto around their exterior surfaces.

5. A fluid pipe line as defined in claim 3, in which said ring segments are bonded to said extending portions of the liners and about said joints and to the confronting ends of the bodies.

6. A fluid pipe line as defined in claim 3, including a waterproof covering encasing said sections and said joint-encasing and filling segments.

7. A fluid pipe line as defined in claim 3, in which said ring segments have reinforcing means embedded therein.

References Cited by the Examiner

UNITED STATES PATENTS

| | | | |
|---|---|---|---|
| 481,912 | 8/1892 | Noll | 138—140 X |
| 1,220,305 | 3/1917 | Wendelken | 138—155 |
| 1,613,461 | 1/1927 | Johnson | 138—155 X |
| 2,070,291 | 2/1937 | McHugh | 138—140 X |
| 2,872,946 | 2/1959 | Stueber | 138—140 |
| 2,974,684 | 3/1961 | Ginaven et al. | 138—141 X |
| 2,991,808 | 7/1961 | Siegmann et al. | 138—141 |
| 3,038,503 | 6/1962 | Dingledy | 138—155 |
| 3,120,570 | 2/1964 | Kennedy et al. | 264—45 |
| 3,155,753 | 11/1964 | Weissman et al. | 264—45 |
| 3,175,586 | 3/1965 | Tatsch | 138—159 X |

FOREIGN PATENTS 1,164,827   5/1958   France.

OTHER REFERENCES

The Product Engineering Publication, Feb. 1955, entitled Foamed Isocyanates, by Kenneth P. Satterly pp. 140–143 inclusive.

LAVERNE D. GEIGER, *Primary Examiner.*

H. ARTIS, *Assistant Examiner.*